(12) United States Patent
Hsu

(10) Patent No.: US 7,442,885 B2
(45) Date of Patent: Oct. 28, 2008

(54) MOBILE WEIGHT ENFORCEMENT VEHICLE

(75) Inventor: Chen-chen Hsu, Taipei (TW)

(73) Assignee: Information Field Co., Ltd., Taipei (TW)

( * ) Notice: Subject to any disclaimer, the term of this patent is extended or adjusted under 35 U.S.C. 154(b) by 52 days.

(21) Appl. No.: 11/711,135

(22) Filed: Feb. 27, 2007

(65) Prior Publication Data

US 2008/0202822 A1 Aug. 28, 2008

(51) Int. Cl.
*B65G 69/00* (2006.01)
*G01G 19/02* (2006.01)
*G01G 19/08* (2006.01)

(52) U.S. Cl. .......................... 177/126; 177/136; 414/21; 414/462; 414/540

(58) Field of Classification Search .................... 414/21, 414/462, 463, 540; 177/126, 136, 141
See application file for complete search history.

(56) References Cited

U.S. PATENT DOCUMENTS

| | | | | |
|---|---|---|---|---|
| 1,936,178 A | * | 11/1933 | Sykes | 177/161 |
| 3,135,401 A | * | 6/1964 | Schramm | 414/537 |
| 3,613,917 A | * | 10/1971 | Fowler, Jr. | 414/540 |
| 4,329,100 A | * | 5/1982 | Golze | 414/21 |
| 4,804,308 A | * | 2/1989 | Hamblin et al. | 414/540 |
| 5,209,312 A | * | 5/1993 | Jensen | 177/136 |
| 5,414,225 A | * | 5/1995 | Garfinkle | 177/199 |
| 5,612,515 A | * | 3/1997 | Eisen | 177/126 |
| 5,701,303 A | * | 12/1997 | Vinel | 370/522 |
| 5,739,477 A | * | 4/1998 | Queen | 177/126 |
| 6,062,805 A | * | 5/2000 | Tremblay et al. | 414/540 |
| 6,585,474 B1 | * | 7/2003 | Kameda | 414/546 |
| 2001/0026756 A1 | * | 10/2001 | Mortimore | 414/556 |

* cited by examiner

*Primary Examiner*—Randy W Gibson
(74) *Attorney, Agent, or Firm*—Troxell Law Office, PLLC

(57) ABSTRACT

A mobile weight enforcement vehicle comprising a vehicle body, a hydraulic vehicle weighing scale mechanism, and a computer measurement display, wherein the hydraulic vehicle weighing scale mechanism is disposed on one side of the vehicle body, and has a hydraulic folding mechanism and a rotating mechanism connecting to a retractable scale crutch. The retractable scale crutch may be folded within the vehicle body conveniently and firmly, or be put on the ground outside the vehicle body so as to examine the weight of the loaded vehicles with the mobile scale device. The examining/monitoring results can be indicated on the computer measurement display, where the operations of catching speeding vehicles, stolen vehicles, or any vehicles that violates traffic regulations are also displayed. The invention provides a diversified and highly efficient tool for maintaining the traffic safety.

10 Claims, 7 Drawing Sheets

MOBILE WEIGHT ENFORCEMENT VEHICLE

FIELD OF THE INVENTION

The present invention relates to a mobile weight enforcement vehicle, and more particularly to a vehicle having a foldable hydraulic weighing scale mechanism for catching vehicles that exceed the weight limit in loading in a more mobile way. Preferably, monitor devices for detecting other violations of traffic regulations are also included with the present invention to provide a powerful tool to enforce traffic regulation and maintain traffic safety, and thus efficiently resolve the current disadvantages and loopholes in traffic regulation enforcement.

BACKGROUND OF THE INVENTION

In the current law enforcement operations for catching overloaded vehicles, fixed vehicle weighing scales are installed in front of the tool stations of the highway to weigh vehicles and check if any vehicles violate traffic regulations. Since the locations of these vehicle weighing scales are fixed, the drivers of the overloaded vehicles may easily steer clear of these fixed stations from the interchanges in front of the vehicle weighing scale stations to avoid the weighing procedure. Consequently, it is not easy to catch overloaded vehicles. Due to the limitations of human resources and equipments, the task of catching overloaded vehicles is even more difficult on ordinary roads or major routes. Moreover, the fact that such tasks require the use of weighing equipment only makes it harder to carry out. Consequently, various problems arise from the enforcement processes, which consume lots of administration resources. Moreover, there are many other types of incidents of traffic violations such as speeding, illegal parking, and other instances of traffic violations. These law enforcement operations aim at catching such violations are separately executed by different groups of police officers with separate sets of equipment, which creates a huge drain on the resource of manpower and equipment. Furthermore, the areas and road sections where the law enforcement operations are executed must be planned in advance, which not only limits the mobility of such operations, but also compromises the effects of law enforcement. Therefore, it is urgent to improve the mobility of law enforcement operations for catching traffic violators and more importantly, the ways for implementing the law enforcement operations.

SUMMARY OF THE INVENTION

To solve the aforesaid problems, the present invention provides a mobile weight enforcement vehicle having a vehicle body which is highly mobile and convenient in use/operations. The invention is easy to be operated and can be equipped with related devices and systems for collecting evidence of traffic violations, which effectively increases the efficiency of operations of law enforcement.

A major objective of the present invention is to provide a weighing vehicle which includes a mobile hydraulic vehicle weighing scale carried by a vehicle body to increase the efficiency of law enforcement operations. The hydraulic vehicle weighing scale includes a hydraulic elevating mechanism and a rotating mechanism connected to a foldable scale crutch. The scale crutch can be firmly folded within the vehicle body as well as unfolded and placed on the ground next to the vehicle body.

Another objective of the invention is to propose a scale crutch of the hydraulic vehicle weighing scale that has scale-part structures adjustable by folding to allow different types of wheelbases of loaded vehicles to fit in. The loading vehicles are guided by the foldable and grilled scale crutch to pass through the scale platform slowly, and this allows the loaded vehicles to be weighed automatically. The operation of the hydraulic vehicle weighing scale and the weighing of loaded vehicles are convenient and efficient, which facilitates the operations of law enforcement.

A further objective of the invention is to display the weighing results obtained via the scale crutch quickly and correctly by the computer measurement display mounted on the vehicle body. Moreover, if an overloaded vehicle is detected, the computer system can readily connect to relevant systems and deal with such incidents. The computer system in the vehicle body can also be connected to the radar camera system and the license-plate recognition system to execute to execute operations of traffic law enforcements, such as monitoring speeding vehicles, identifying stolen vehicles, or other types of traffic violations. Accordingly, the operation of law enforcement is diversified at the same time, which not only increases the efficiency of the operation, but also makes it easier to carry out. More importantly, the operation of law enforcement can be made more transparent and credible, which is a crucial factor in reducing the complaints made against the law enforcement operation.

BRIEF DESCRIPTION OF THE DRAWINGS

The objectives and effects of the present invention will become more apparent to those ordinarily skilled in the art after reviewing the following detailed description and accompanying drawings, in which.

REFERENCE NUMERALS IN DRAWING

| | |
|---|---|
| 1 vehicle body | 10 vehicle frame |
| 101 elevating mechanism | 11 hydraulic vehicle weighing scale |
| 111 folding mechanism | 112 rotating mechanism |
| 1121 worm | 1122 worm gear |
| 113 scale crutch | 1131 guiding rail |
| 1132 center crutch | 1133 weight detector |
| 1134 folding mechanism | 114 rotation shaft |
| 12 computer measurement display | 121 weight indicator |
| 122 camera | 123 information display |

-continued

| 13 door | 14 lighting device |
| 15 alarm | A ground |

DETAILED DESCRIPTION OF PREFERRED EMBODIMENTS

Figure 1:
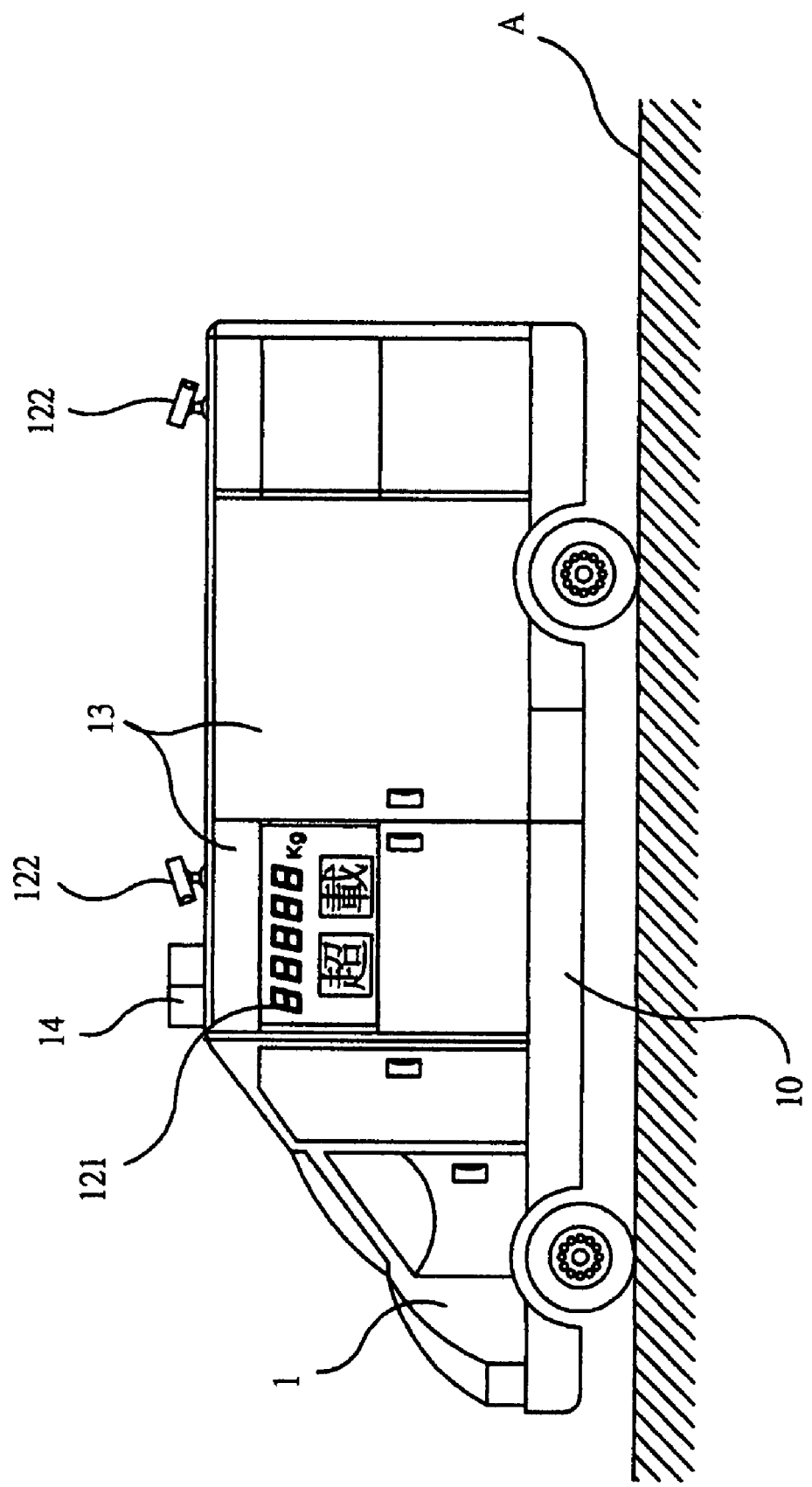
FIG. 1 is a side view of a vehicle body according to an embodiment of the invention.
Figure 2:
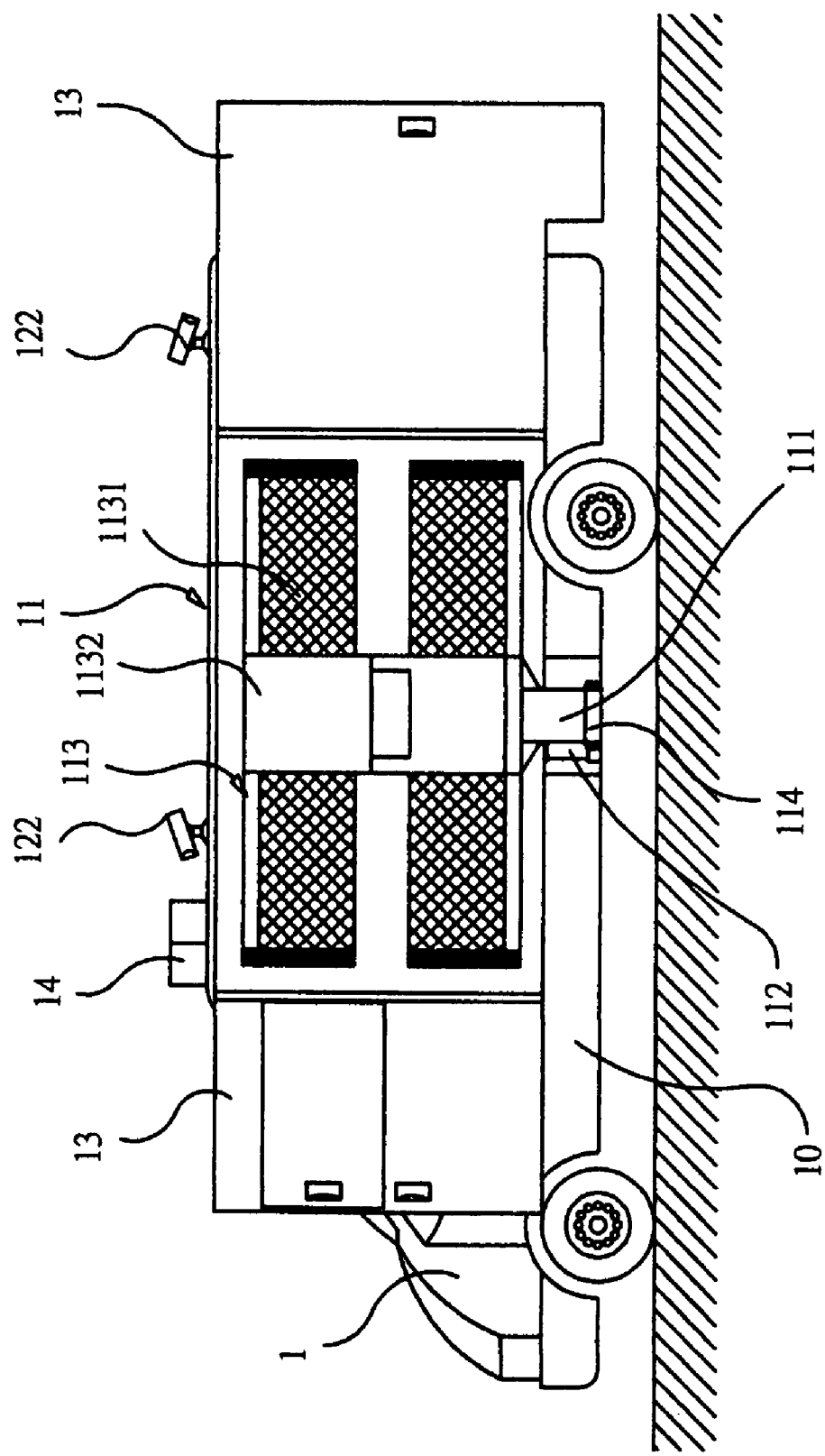
FIG. 2 is a perspective view illustrating the vehicle body of FIG. 1 with door opened.

The invention includes a vehicle body 1, a hydraulic vehicle weighing scale 11 and a computer measurement display 12. As shown in FIG. 1 illustrating a side view of a preferred embodiment according to the invention, a weight indicator 121 of the computer measurement display 12 can be observed on the liftable type door 13 on one side of the vehicle body 1. A lighting device 14 and a camera 122 of the computer measurement display 12 are mounted on top of the vehicle. The hydraulic vehicle weighing scale 11 installed within the lateral side of the vehicle body 1 can be seen when the door 13 is opened. The hydraulic vehicle weighing scale 11 includes a hydraulic folding mechanism 111, a hydraulic rotating mechanism 112, and a scale crutch 113. The hydraulic folding mechanism 111 is mounted on the vehicle frame 10 of the vehicle body 1 and is connected to the hydraulic rotating mechanism 112 through a rotation shaft 114. The other end of the hydraulic folding mechanism 111 is connected to the scale crutch 113 so that the scale crutch 113 can be disposed alongside the lateral side of the vehicle body 1 firmly.

Figure 3:
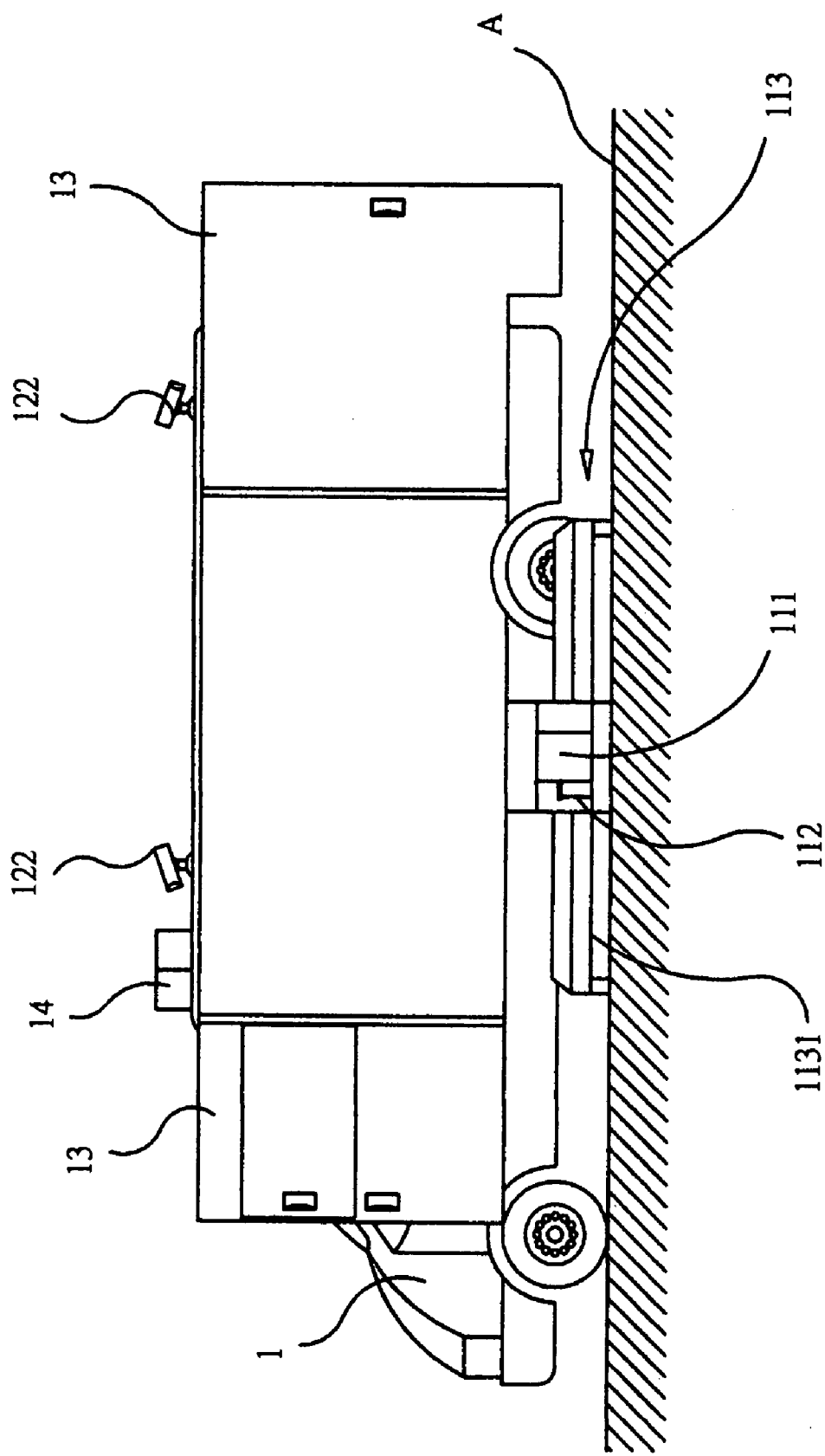
FIG. 3 is a perspective view illustrating that a scale crutch original folded in the vehicle body of FIG. 1 is disposed on the ground beside the vehicle body.
Figure 4:
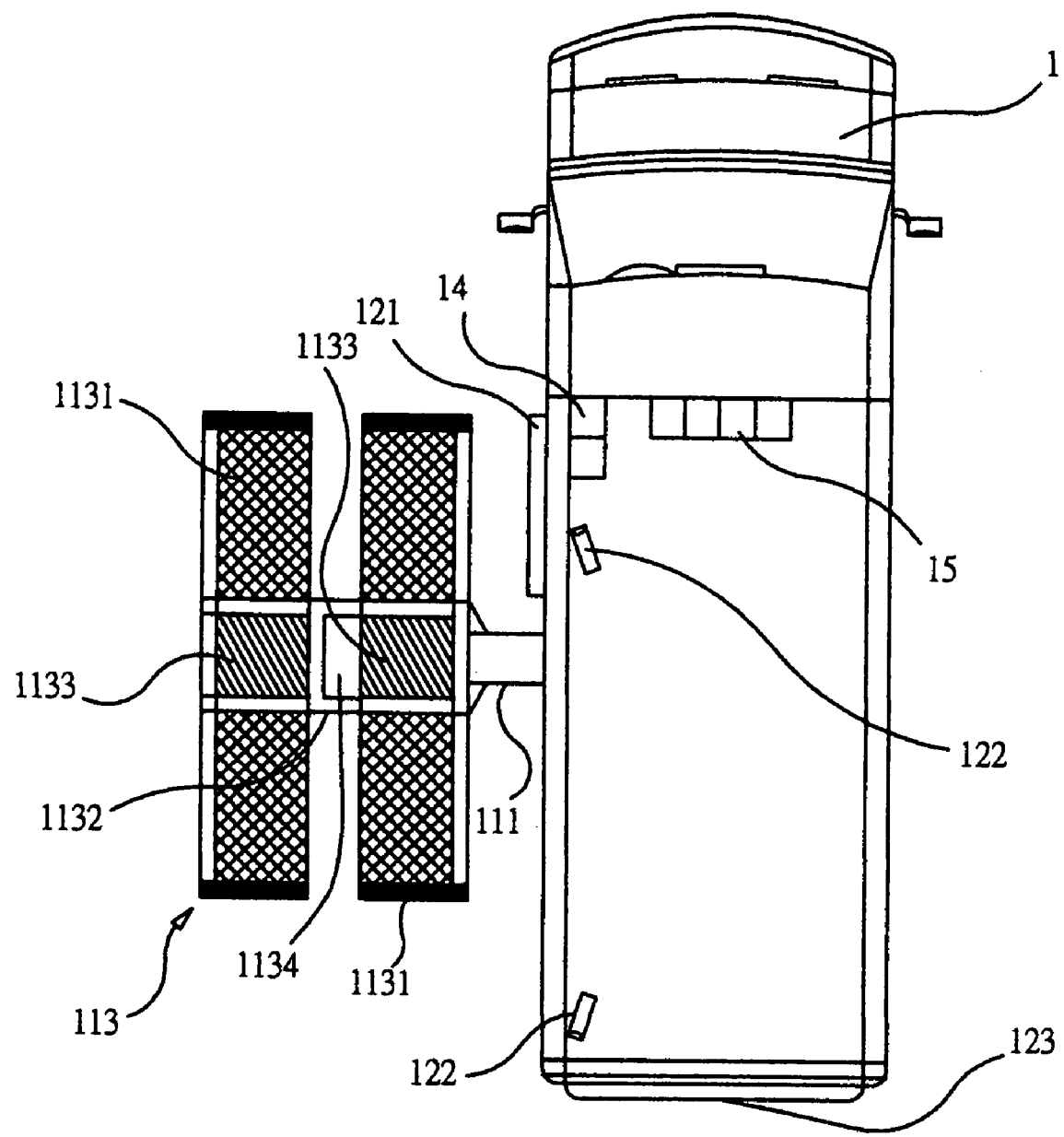
FIG. 4 is a top view of the vehicle body of FIG. 3.
Figure 5:
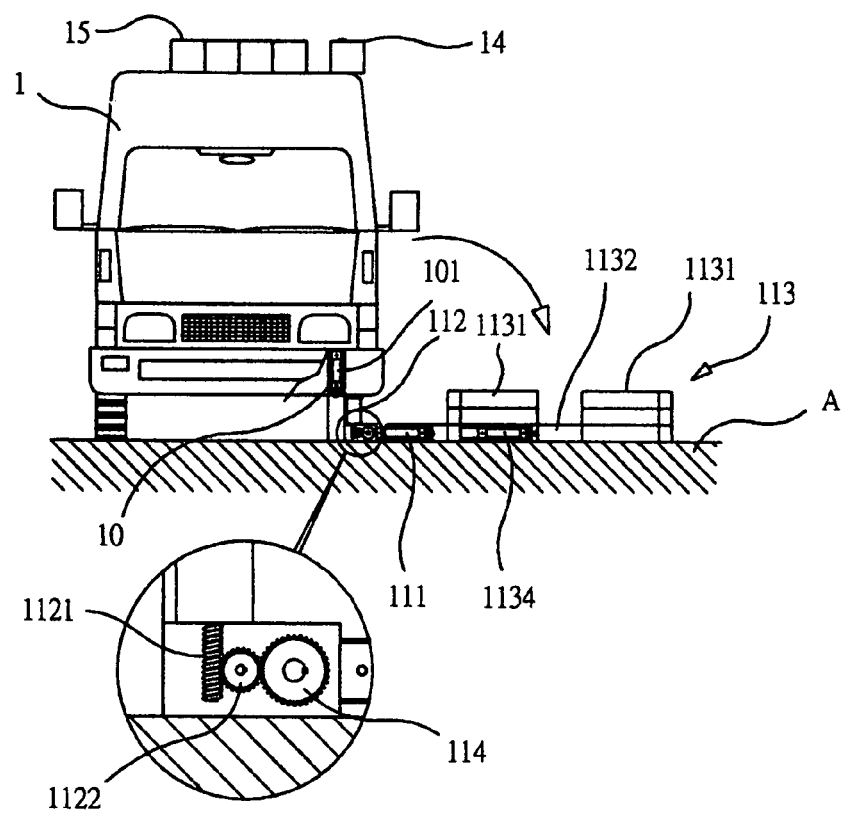
FIG. 5 is a perspective view illustrating the rotation of the scale crutch originally folded within the vehicle body according to an embodiment of the invention.
Figure 6:
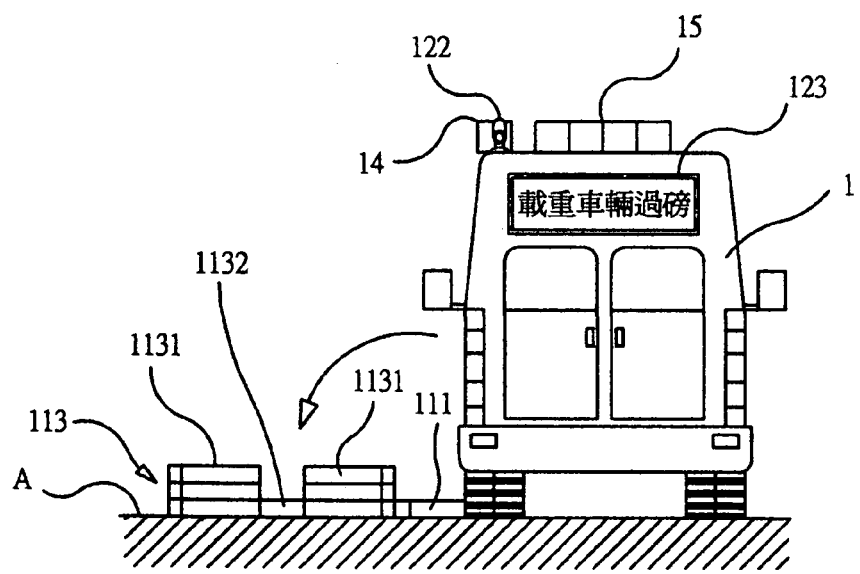
FIG. 6 is a rear view of the vehicle body of FIG. 5.
Figure 7:
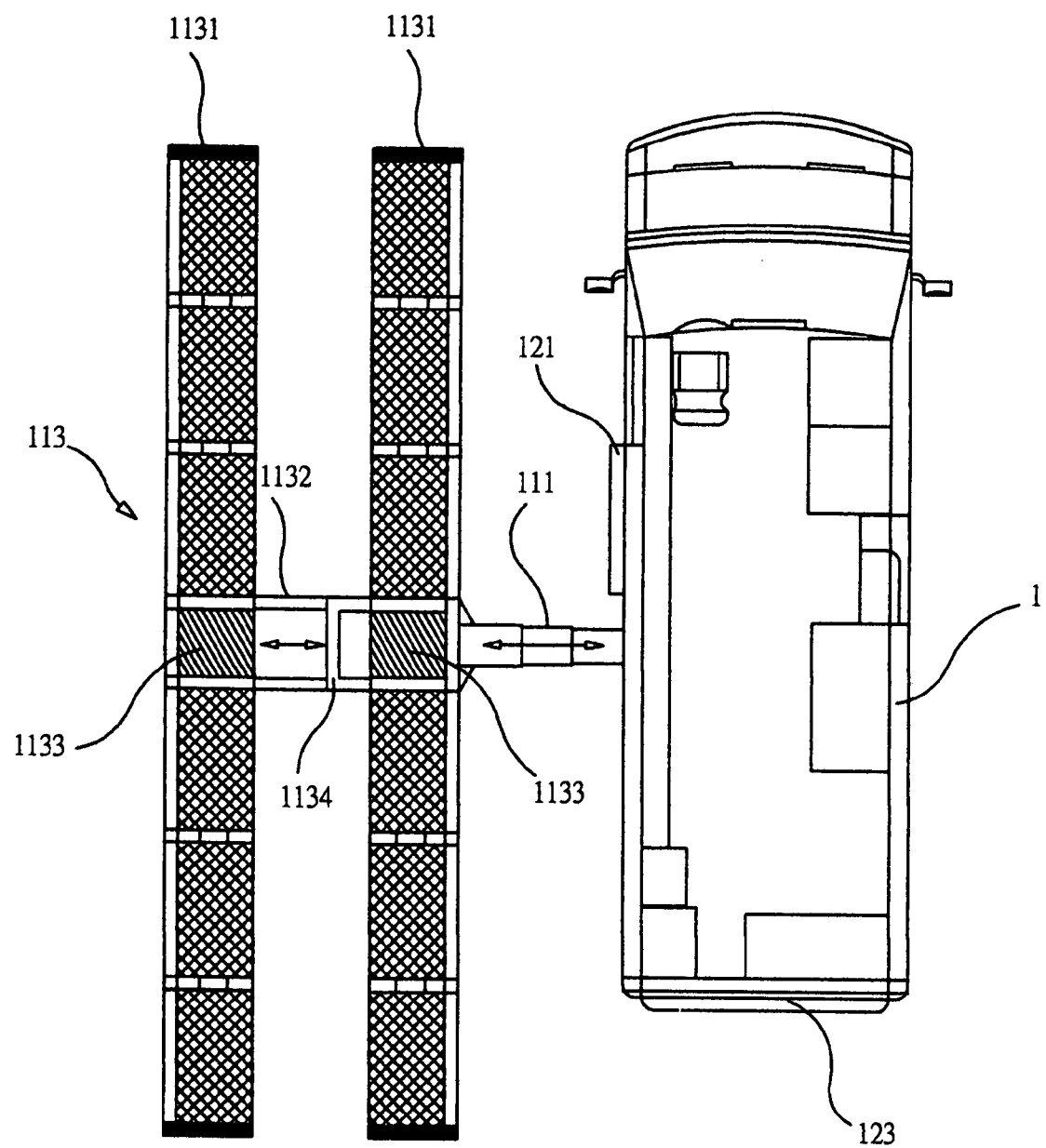
FIG. 7 is a perspective view illustrating the usage of the hydraulic weighing mechanism for the vehicle body according to an embodiment of the invention.

While operating the hydraulic vehicle weighing scale 11, by means of the worm 1121 and the worm gear 1122 (as shown in the enlarged portion of FIG. 5) of the hydraulic rotating mechanism 112, the rotation shaft 114 will be driven to rotate the folding mechanism 111 and the connected scale crutch 113 from the inside of the vehicle body 1 to the outside of the vehicle body 1. The rotating mechanism 112 is further connected to a hydraulic elevating mechanism 101 mounted on the vehicle frame 10. The folding mechanism 111 and the connected scale crutch 113 rotated to the outside of the vehicle body 1 can be, as shown in FIG. 3, dropped down to the ground A (as shown in FIG. 3) through the elevating mechanism 101. In such a situation, the opened door 13 is preferably closed again to allow the weight indicator 121 of the computer measurement display 12 to be moved to a more noticeable location on the vehicle body 1. As shown in the top view of the vehicle body indicated in FIG. 4, the scale crutch 113 is constructed by two parallel guiding rails 1131 and a center crutch 1132 to form an "H" shaped crutch that can be horizontally placed alongside an outer lateral side of the vehicle body 1. Furthermore, in addition to the weight indicator 12 of the computer measurement display 12, an information display 123 is also included and mounted on the end of the vehicle body 1 to give instructions to the vehicles to be examined (as shown in FIG. 6). An alarm 15 is frontally mounted on top of the vehicle body 1 to indicate the status of law enforcement operation. FIG. 7 indicates the operation status of an embodiment according to the invention. The distance between the scale crutch 113 and the vehicle body 1 can be adjusted by the folding mechanism 111. The guiding rails 1131 preferably include foldable pivot structures so as to extend the rail length on both ends of each guiding rail. There are two weight detectors 1133 respectively mounted of the intersections of the center crutch 1132 and the two guiding rails 1131. The examined vehicle is guided by the guiding rails 1131 to pass through the weight detectors 1133 slowly. As long as the vehicle passes through without stopping, the weight detected by the weight detectors 1133 is recorded and collected by the computer measurement display 12 inside the vehicle body 1 and indicated on the weight indicator 121. Accordingly, whether the examined vehicle is overloaded or not can be readily differentiated. Furthermore, the system of the computer measurement display 12 is allowed to execute the necessary procedures concerning law enforcement immediately via connection to relevant systems, so as to increase the efficiency of law enforcement operation and prevent unnecessary delays.

Figure 8:
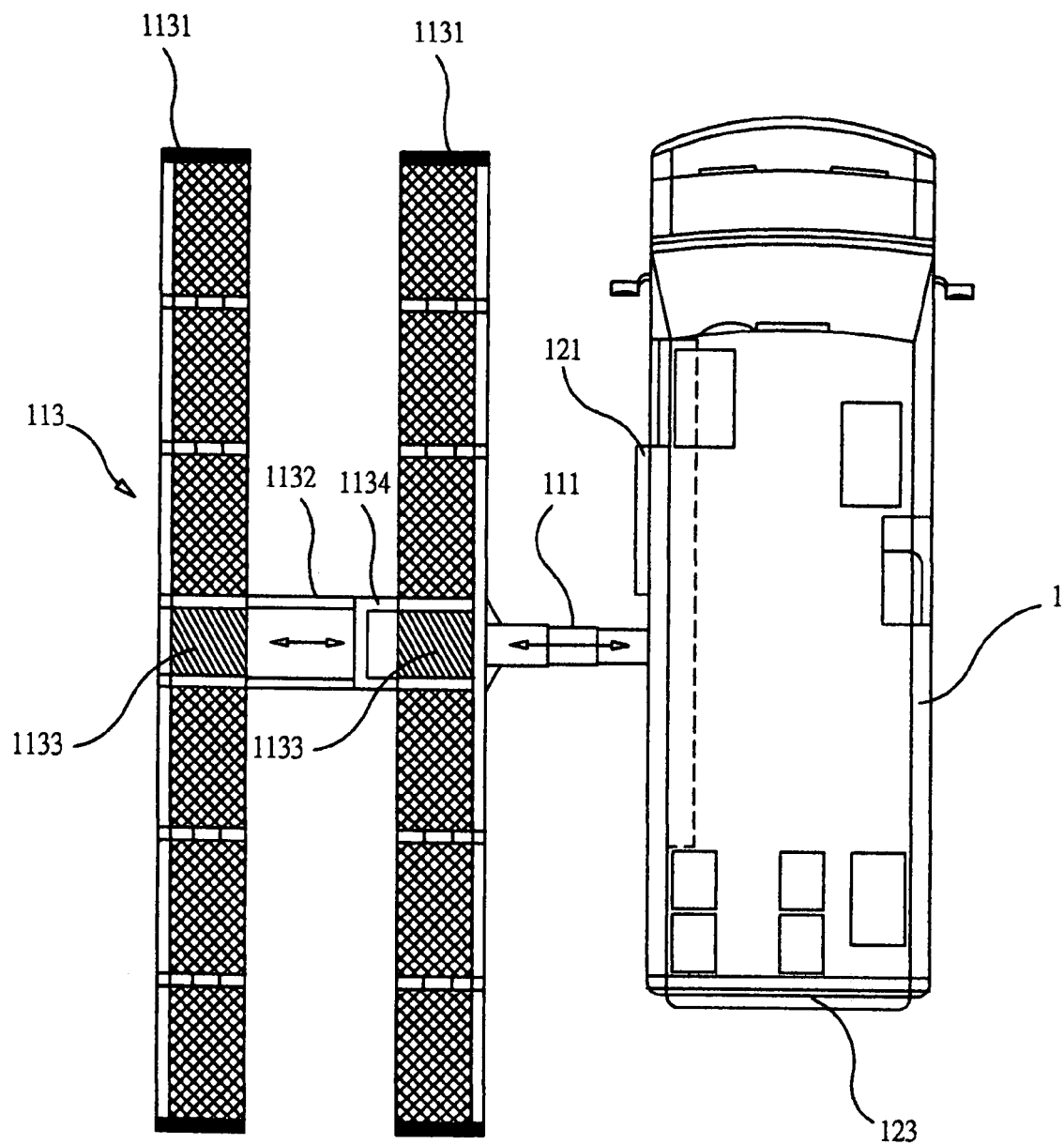
FIG. 8 is a perspective view illustrating the usage of the hydraulic weighing mechanism for the vehicle body according to another embodiment of the invention.

Furthermore, the center crutch 1132 includes another hydraulic folding mechanism 1134 for adjusting the space between two guiding rails 1131. As shown in FIG. 8, the distance between the two guiding rails 1131 can be adjusted through the folding mechanism 1134, so that a suitable distance can be adjusted to allow vehicles with narrow wheelbase or special wheelbase to fit in. Therefore, the operations for rotating the scale crutch 113 from the inside of the vehicle body 1 to the ground A alongside the external side of the vehicle body 1 and stretching the parts of the scale crutch 113 to the predetermined positions for the examining operation are performed through the hydraulic mechanisms (101, 111, 112, and 1134). When the examining operation is finished, the scale crutch 113 can be folded within the vehicle body 1 by reversing the operation of the hydraulic mechanism. Accordingly, the operation process is not only convenient but also efficient. The mobility of the vehicle body 1 makes it possible to choose a suitable location on the highway or on a ordinary road to execute the law enforcement operation, which is very useful for catching overloaded vehicles.

Moreover, the computer system of the computer measurement display 12 and its camera 122 are equipped with the radar camera system and a license-plate recognition system (not shown in Figures) to execute the operations of law enforcements such as monitoring speeding vehicles, identifying stolen vehicles, or other types of traffic violations. The installation of the lighting device 14 in the vehicle body 1 allows the mobile weighing vehicle to be operated at any time. As a result, this diversified and highly functional mobile weighing vehicle can greatly facilitate the operation of law enforcement.

While the invention has been described in terms of what is presently considered to be the most practical and preferred embodiments, it is to be understood that the invention is not limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A mobile weight enforcement vehicle comprising vehicle body, a hydraulic weighing mechanism, and a computer measurement display, wherein:

said vehicle body has said hydraulic weighing mechanism mounted on one of its lateral sides, while said computer measurement display also being mounted on said vehicle body;

said hydraulic weighing mechanism including a hydraulic folding mechanism, a rotating mechanism, and a foldable scale crutch, wherein one end of said folding mechanism being connected to the rotating mechanism via a rotation shaft, and the other end of said folding mechanism being connected to said scale crutch; said scale crutch has a weight detector mounted on it; and said computer measurement display including a weight indicator and a camera; wherein said hydraulic weighing mechanism allows said scale crutch to be folded within said vehicle body; and said hydraulic weighing mechanism also allows said scale crutch to be rotated and placed on a ground next to said vehicle body to have a loaded vehicle weighed by said weight detector, and said weight indicator of said computer measurement display shows the result of weighing.

2. A mobile weight enforcement vehicle according to claim 1, wherein said vehicle body further includes an elevating mechanism mounted on a frame of said vehicle body, and connected to said rotating mechanism of said hydraulic weighing mechanism.

3. A mobile weight enforcement vehicle according to claim 1, wherein said rotating mechanism of said hydraulic weighing mechanism includes a worm/worm gear mechanism for driving said folding mechanism and said scale crutch connected thereon to rotate.

4. A mobile weight enforcement vehicle according to claim 1, wherein said scale crutch of said hydraulic weighing mechanism is constructed by two parallel guiding rails and a center crutch bridging said guiding rails; said guiding rails include foldable pivot structures, and weight detectors are respectively mounted on the intersections of said center crutch and said guiding rails.

5. A mobile weight enforcement vehicle according to claim 4, wherein said center crutch in said scale crutch of said hydraulic weighing mechanism includes a hydraulic folding mechanism for adjusting the distance between said guiding rails.

6. A mobile weight enforcement vehicle according to claim 1, wherein said weight indicator of said computer measurement display is mounted on an external lateral side of said vehicle body.

7. A mobile weight enforcement vehicle according to claim 1, wherein said camera of said computer measurement display is mounted on top of said vehicle body.

8. A mobile weight enforcement vehicle according to claim 7, wherein the top of said vehicle body further includes a lighting device and an alarm.

9. A mobile weight enforcement vehicle according to claim 1, wherein said computer measurement display further includes an information display mounted on an end of said vehicle body.

10. A mobile weight enforcement vehicle according to claim 1, wherein a computer system and said camera of said computer measurement display can connect to a radar camera system and a license-plate recognition system to execute operations of traffic law enforcements.

* * * * *